(12) United States Patent
Jan et al.

(10) Patent No.: US 11,042,198 B2
(45) Date of Patent: Jun. 22, 2021

(54) HINGE MODULE AND ELECTRONIC DEVICE

(71) Applicants: Cheng-Shiue Jan, Taipei (TW); Wei-Hao Lan, Taipei (TW)

(72) Inventors: Cheng-Shiue Jan, Taipei (TW); Wei-Hao Lan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/447,987

(22) Filed: Jun. 21, 2019

(65) Prior Publication Data

US 2020/0012322 A1 Jan. 9, 2020

Related U.S. Application Data

(60) Provisional application No. 62/688,369, filed on Jun. 21, 2018.

(51) Int. Cl.
| | |
|---|---|
| *E05D 3/06* | (2006.01) |
| *G06F 1/16* | (2006.01) |
| *E05D 3/18* | (2006.01) |
| *E05D 7/00* | (2006.01) |

(52) U.S. Cl.
CPC ............. *G06F 1/1681* (2013.01); *E05D 3/18* (2013.01); *E05D 7/0045* (2013.01); *E05D 2007/0072* (2013.01); *E05Y 2900/606* (2013.01)

(58) Field of Classification Search
CPC .. E05D 3/12; E05D 3/18; E05D 3/122; E05D 3/06; E05D 3/10; E05D 7/0045; E05D 11/082; E05D 11/087; E05D 2011/085; E05D 2007/0072; G06F 1/1681; G06F 1/1616; G06F 1/1618; G06F 1/168; E05Y 2900/606; E05Y 2900/602; H04M 1/0216;
(Continued)

(56) References Cited

U.S. PATENT DOCUMENTS 5,102,084 A * 4/1992 Park ...................... G06F 1/1616
16/338
5,635,928 A * 6/1997 Takagi .................. G06F 1/1616
341/22
(Continued)

FOREIGN PATENT DOCUMENTS

WO WO-2019194796 A1 * 10/2019 ............... H05K 5/00

*Primary Examiner* — Chuck Y Mah
(74) *Attorney, Agent, or Firm* — JCIPRNET

(57) ABSTRACT

A hinge module includes a base, a first shaft, a second shaft, a first bracket, a second bracket, and a linkage component. The base has a bottom plate and two guiding plates opposite to each other. The first shaft is movably and rotatably penetrates through the two guiding plates. The second shaft is movably and rotatably penetrates through the two guiding plates. The first bracket is disposed at a first end of the first shaft. The second bracket is disposed at a first end of the second shaft. The linkage component is disposed in the base and is connected to the first shaft and the second shaft. The first shaft and the second shaft linearly move along the two guiding plates through the linkage component to change a spacing distance between the first shaft and the second shaft and are configured to drive the first bracket and the second bracket to move away from each other or approach each other.

13 Claims, 16 Drawing Sheets

(58) Field of Classification Search
CPC .. H04M 1/0222; H04M 1/022; H05K 5/0226; Y10T 16/547; Y10T 16/541
See application file for complete search history.

(56) References Cited

U.S. PATENT DOCUMENTS

| | | | | |
|---|---|---|---|---|
| 8,347,461 | B2* | 1/2013 | Chen | G06F 1/1624 |
| | | | | 16/354 |
| 8,776,319 | B1* | 7/2014 | Chang | G06F 1/1681 |
| | | | | 16/366 |
| 10,174,535 | B2* | 1/2019 | Lin | G06F 1/1681 |
| 10,352,354 | B1* | 7/2019 | Hsu | G06F 1/1652 |
| 2009/0070961 | A1* | 3/2009 | Chung | E05D 3/122 |
| | | | | 16/354 |
| 2010/0283367 | A1* | 11/2010 | Coleman | E05D 3/022 |
| | | | | 312/405 |
| 2011/0157780 | A1* | 6/2011 | Wang | G06F 1/1681 |
| | | | | 361/679.01 |
| 2011/0289728 | A1* | 12/2011 | Wang | G06F 1/1681 |
| | | | | 16/337 |
| 2012/0046076 | A1* | 2/2012 | Masser | G06F 1/1681 |
| | | | | 455/566 |
| 2012/0137471 | A1* | 6/2012 | Kujala | G06F 1/1681 |
| | | | | 16/382 |
| 2013/0016492 | A1* | 1/2013 | Wang | G06F 1/1681 |
| | | | | 361/820 |
| 2014/0290009 | A1* | 10/2014 | Kasai | E05D 3/12 |
| | | | | 16/386 |
| 2015/0159413 | A1* | 6/2015 | Chen | E05D 3/122 |
| | | | | 16/342 |
| 2020/0166974 | A1* | 5/2020 | Ai | G06F 1/1641 |
| 2020/0241602 | A1* | 7/2020 | Ku | G06F 1/1618 |

* cited by examiner

HINGE MODULE AND ELECTRONIC DEVICE

CROSS-REFERENCE TO RELATED APPLICATION

This application claims the priority benefit of U.S. provisional application Ser. No. 62/688,369, filed on Jun. 21, 2018. The entirety of the above-mentioned patent application is hereby incorporated by reference herein and made a part of this specification.

BACKGROUND

Technical Field

The disclosure relates to a hinge module, and more particularly, relates to a hinge module applied to an electronic device.

Description of Related Art

At present, a hinge module is applied to an electronic device such as a notebook computer, a tablet computer, or a handheld game console most of the time. The hinge module is mainly pivotally connected between the first body and the second body of the electronic device, so that the first body and the second body may be relatively unfolded or may be relatively folded, and that the electronic device may be conveniently used or conveniently stored. Nevertheless, in order to allow the electronic device to be flipped, a gap of a certain size is required to be maintained between the first body and the second body, so that the first body and the second body are prevented from interfering with each other when being flipped.

When the electronic device is switched to the unfolded state through the hinge module and the first body and the second body are unfolded so the included angle therebetween reaches 180 degrees, a gap of a certain width still exists between the first body and the second body. But when the first body and the second body are both touch screens, touch operation, touch writing, and image playing functions may be affected by such gap.

Accordingly, development of a hinge module configured to reduce the gap created when an electronic device is unfolded is an important goal.

SUMMARY

The disclosure provides a hinge module adapted to be connected to an electronic device and adapted to adjust a shaft distance and a bracket gap so that the electronic device may be switched to an unfolded state or a folded state.

The disclosure provides a hinge module including a base, a first shaft, a second shaft, a first bracket, a second bracket, and a linkage component. The base has a bottom plate and two guiding plates opposite to each other. The first shaft is movably and rotatably penetrates through the two guiding plates. The second shaft is movably and rotatably penetrates through the two guiding plates. The first shaft and the second shaft are spaced apart from each other and are located above the bottom plate. The first bracket is disposed at a first end of the first shaft. The second bracket is disposed at a first end of the second shaft. The linkage component is disposed in the base and is connected to the first shaft and the second shaft. The first shaft and the second shaft linearly move along the two guiding plates through the linkage component to change a spacing distance between the first shaft and the second shaft and are configured to drive the first bracket and the second bracket to move away from each other or approach each other.

The disclosure provides an electronic device. When being switched to an unfolded state, the electronic device may be closely fitted, so that effects for enhancing gaming experiences, image outputs, etc. are provided. When the electronic device is in a folded state, an accommodating space is formed and is configured to receive an object.

The electronic device provided by the disclosure includes two hinge modules, a first body, and a second body. Each of the hinge modules includes a base, a first shaft, a second shaft, a first bracket, a second bracket, and a linkage component. The base has a bottom plate and two guiding plates opposite to each other. The first shaft is movably and rotatably penetrates through the two guiding plates. The second shaft is movably and rotatably penetrates through the two guiding plates. The first shaft and the second shaft are spaced apart from each other and are located above the bottom plate. The first bracket is disposed at a first end of the first shaft. The second bracket is disposed at a first end of the second shaft. The linkage component is disposed in the base and is connected to the first shaft and the second shaft. The first shaft and the second shaft linearly move along the two guiding plates through the linkage component to change a spacing distance between the first shaft and the second shaft and are configured to drive the first bracket and the second bracket to move away from each other or approach each other. The first body is disposed on the two hinge modules, and the first body is fixedly connected to the two first brackets. The second body is disposed on the two hinge modules, and the second body is fixedly connected to the two second brackets. The first body and the second body are adapted to move away from each other or approach each other to be switched to the folded state or the unfolded state.

In view of the above, the hinge module provided by the disclosure is adapted to be connected to the first body and the second body (e.g., display screens) of the electronic device. When the first body and the second body are unfolded relatively or folded relatively, the first body and the second body may be driven through the linkage component to move away from each other relatively or approach each other relatively. When the electronic device is switched to the unfolded state, the spacing distance between the first shaft and the second shaft is reduced, so that the first body and the second body may be close to and integrated with each other, and that effects for enhancing touch operation, gaming experiences, large-scale image outputs, etc. are provided. When the electronic device is switched to the folded state, the spacing distance between the first shaft and the second shaft is expanded, so that the first body and the second body are separated from each other relatively and an accommodating space therebetween is formed, and such space may thus be used to receive other functional elements such as a stylus pen.

To make the aforementioned more comprehensible, several embodiments accompanied with drawings are described in detail as follows.

DESCRIPTION OF THE EMBODIMENTS

Figure 1A:
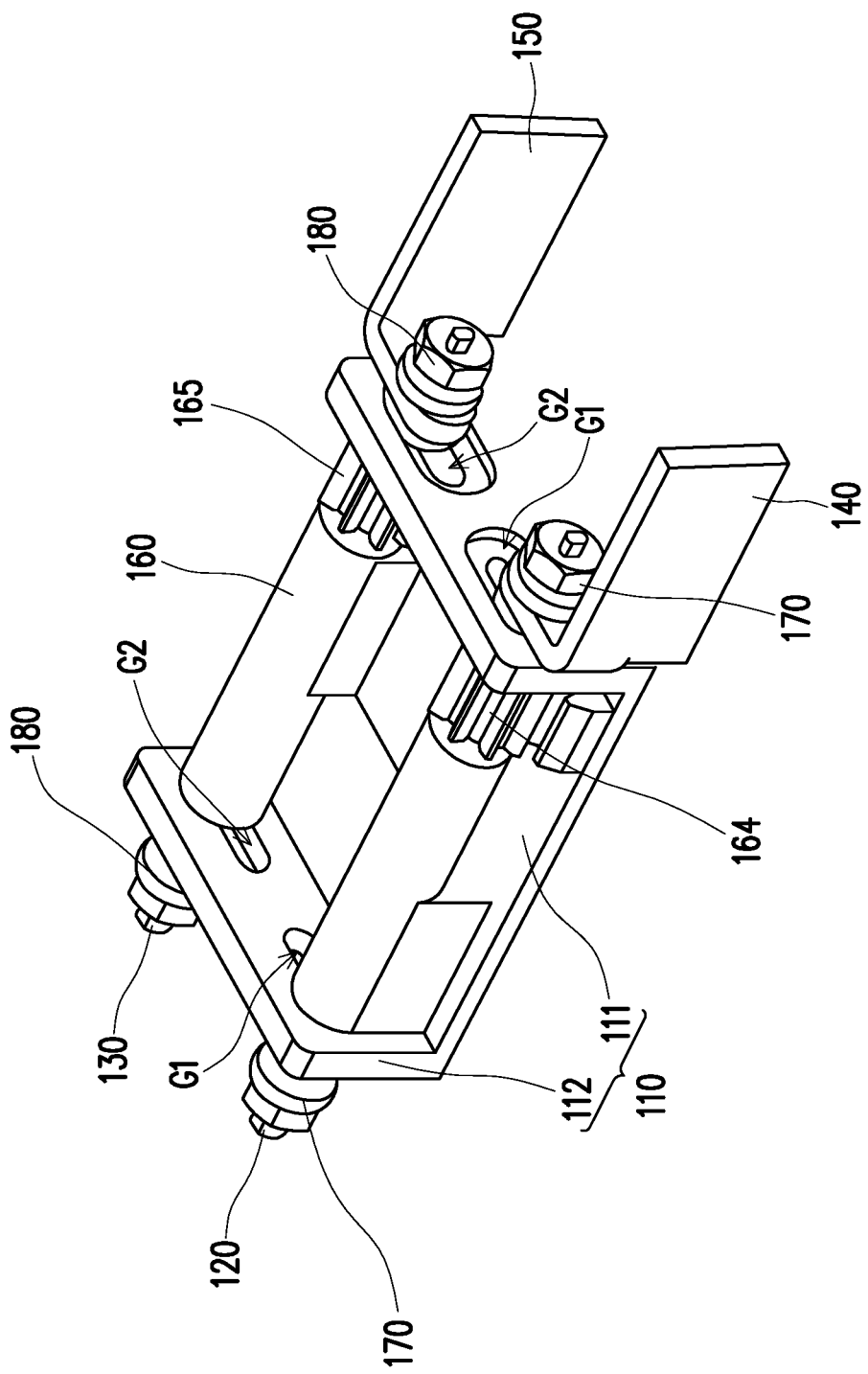
FIG. 1A is a schematic three-dimensional view of a hinge module according to an embodiment of the disclosure.
Figure 1B:
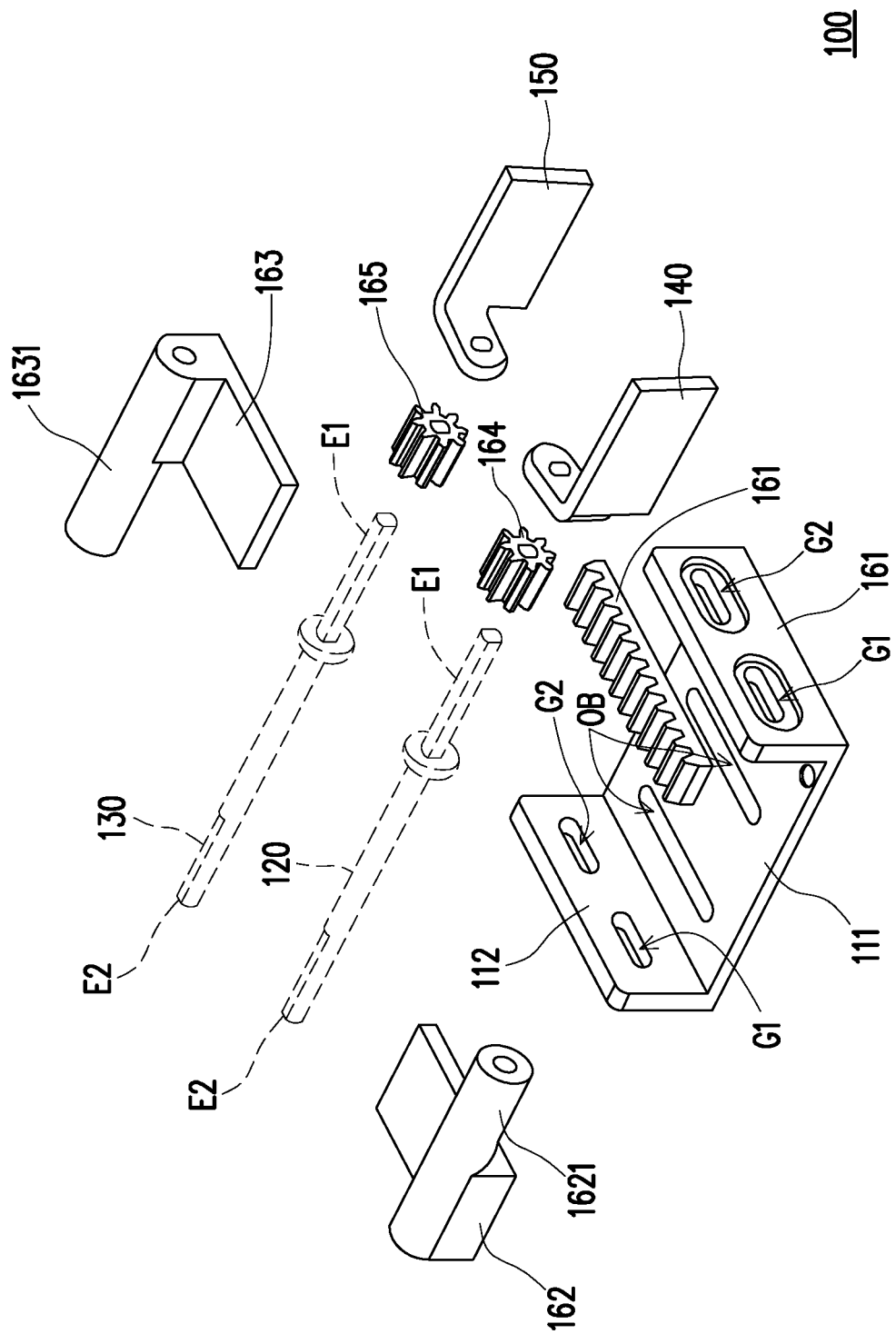
FIG. 1B is a schematic exploded view of part of elements of the hinge module of FIG. 1A.
Figure 1C:
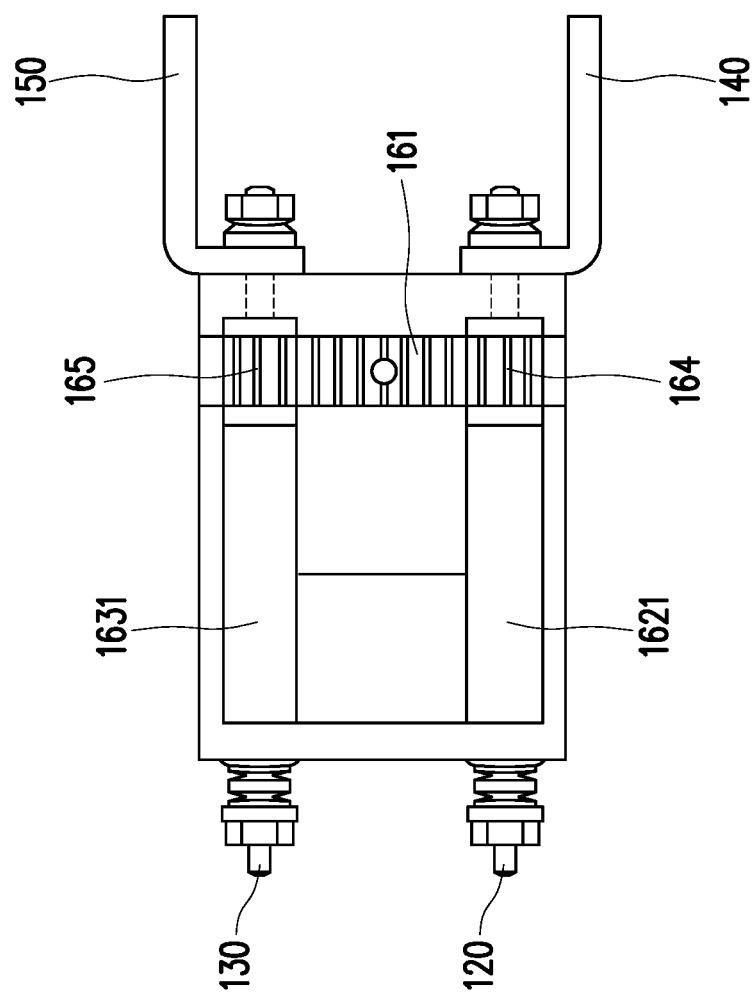
FIG. 1C is a schematic top view of the hinge module of FIG. 1A.
Figure 1D:
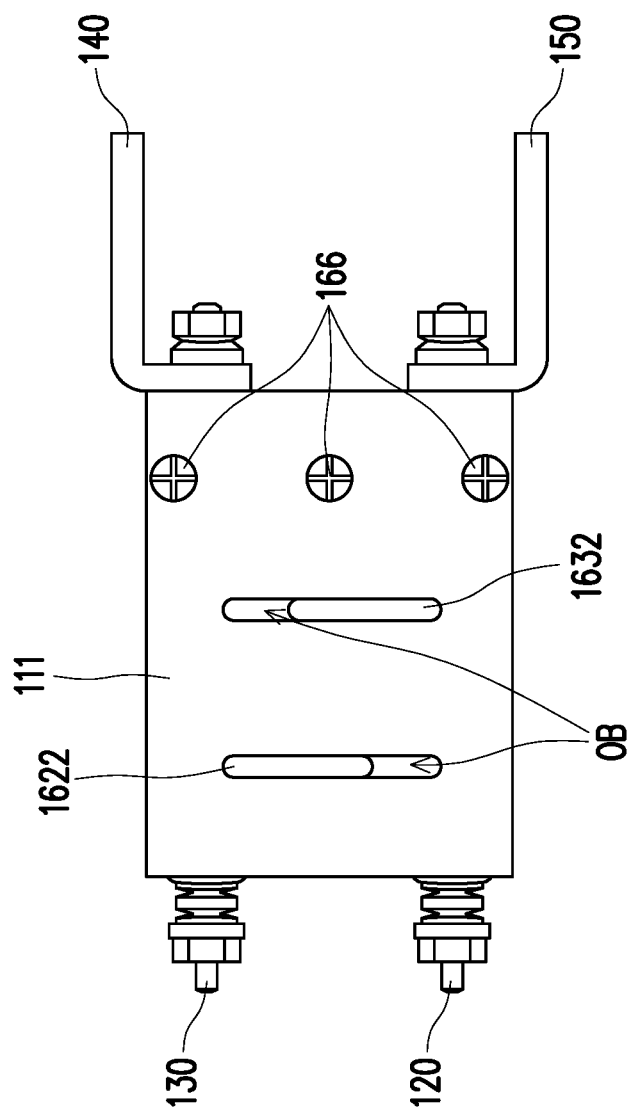
FIG. 1D is a schematic bottom view of the hinge module of FIG. 1A.
Figure 1E:
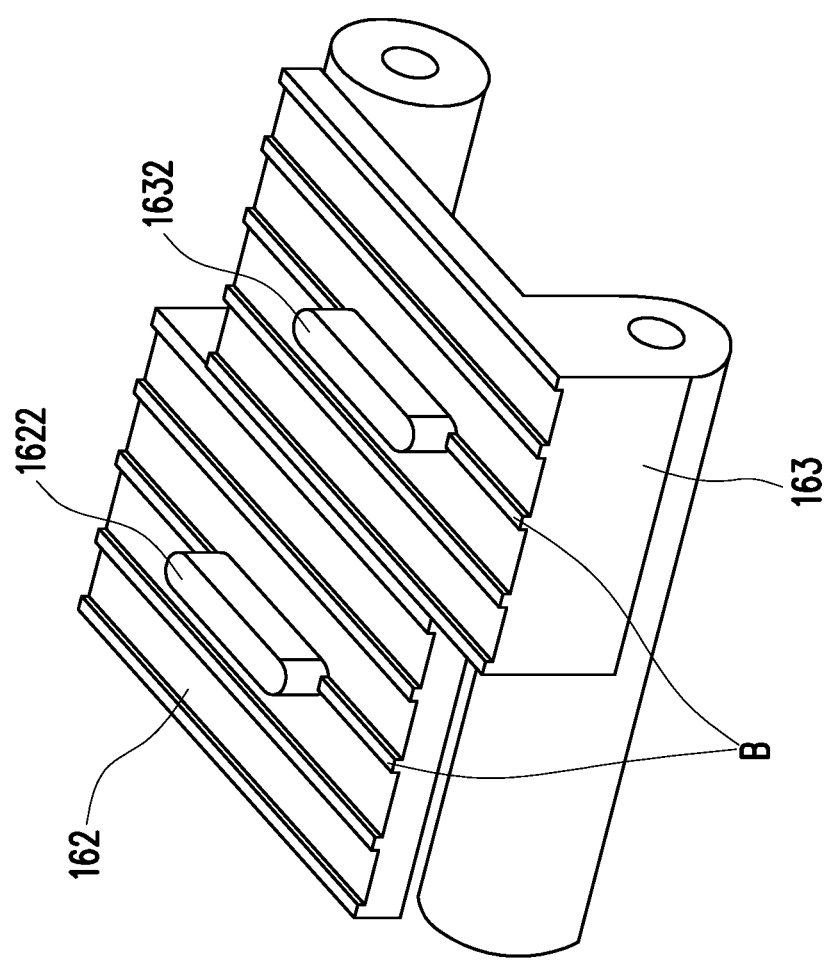
FIG. 1E is a schematic three-dimensional view of a first sliding base and a second sliding base of a linkage component of FIG. 1A.

FIG. 1A is a schematic three-dimensional view of a hinge module according to an embodiment of the disclosure. FIG. 1B is a schematic exploded view of part of elements of the hinge module of FIG. 1A. FIG. 1C is a schematic top view of the hinge module of FIG. 1A. FIG. 1D is a schematic bottom view of the hinge module of FIG. 1A. FIG. 1E is a schematic three-dimensional view of a first sliding base and a second sliding base of a linkage component of FIG. 1A.

With reference to FIG. 1A to FIG. 1D, a hinge module 100 provided by the disclosure includes a base 110, a first shaft 120, a second shaft 130, a first bracket 140, a second bracket 150, and a linkage component 160.

The base 110 has a bottom plate 111 and two guiding plates 112 opposite to each other, and the two guiding plates 112 are perpendicular to the bottom plate 111, for example. The first shaft 120 is movably and rotatably penetrates through the two guiding plates 112. The second shaft 130 is movably and rotatably penetrates through the two guiding plates 112. The first shaft 120 and the second shaft 130 are spaced apart from each other and are located above the bottom plate 111, which means that the first shaft 120 and the second shaft 130 may shift relative to each other on the bottom plate 111.

The first bracket 140 is, for example, shaped as an L-shape structure and is disposed at a first end E1 of the first shaft 120. The second bracket 150 is, for example, shaped as an L-shape structure and is disposed at a first end E1 of the second shaft 130. The linkage component 160 is disposed in the base 110 and is connected to the first shaft 120 and the second shaft 130.

Figure 2A:
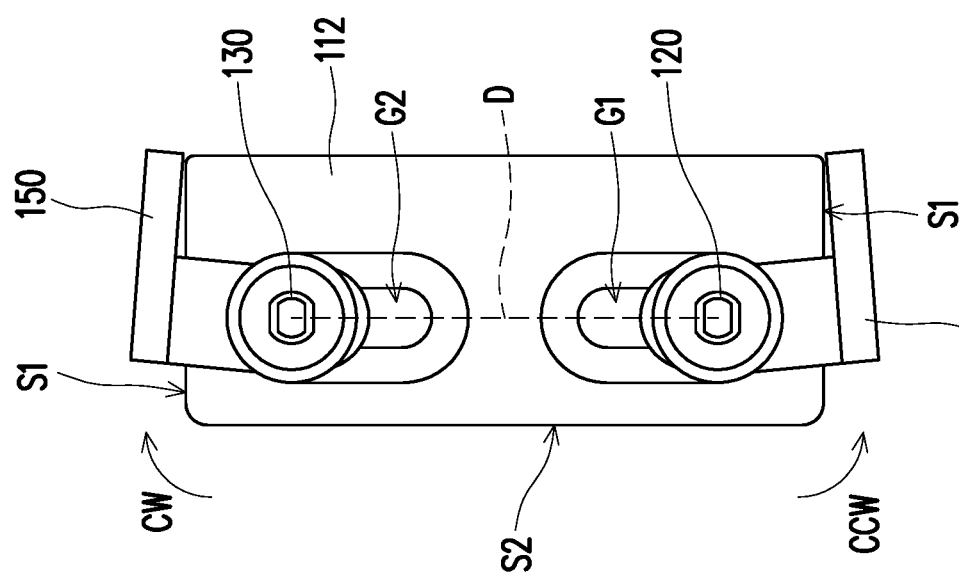
FIG. 2A is a schematic side view of the hinge module of FIG. 1A in a folded state.
Figure 2B:
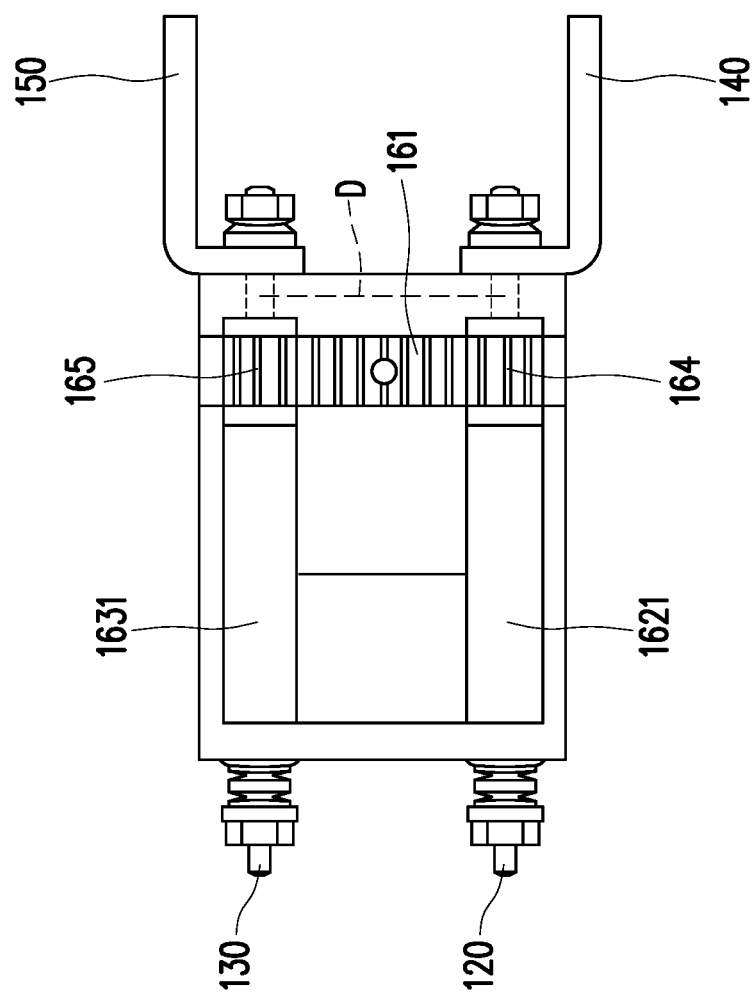
FIG. 2B is a schematic top view of the hinge module of FIG. 2A in the folded state.
Figure 2C:
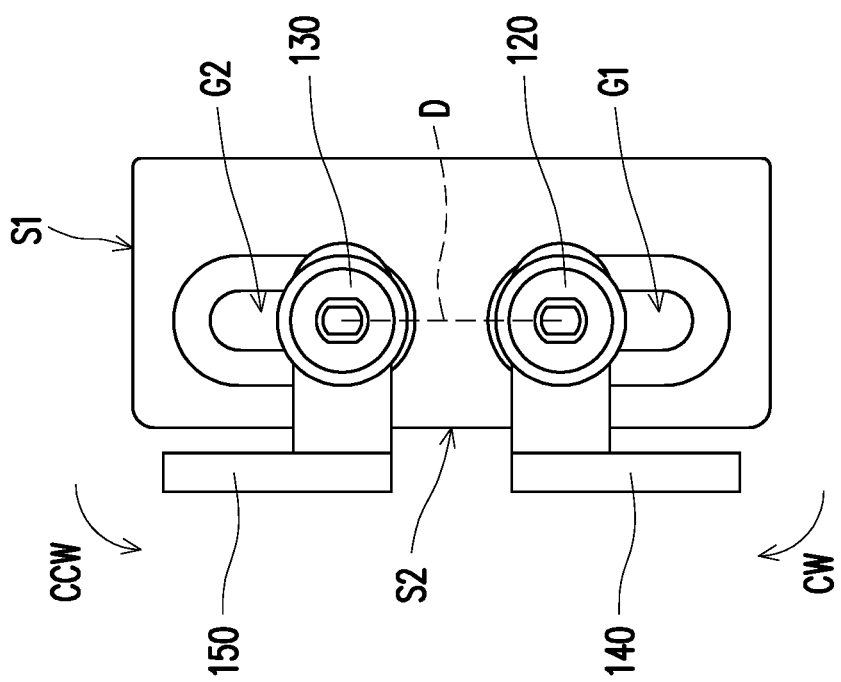
FIG. 2C is a schematic side view of the hinge module of FIG. 1A in an unfolded state.
Figure 2D:
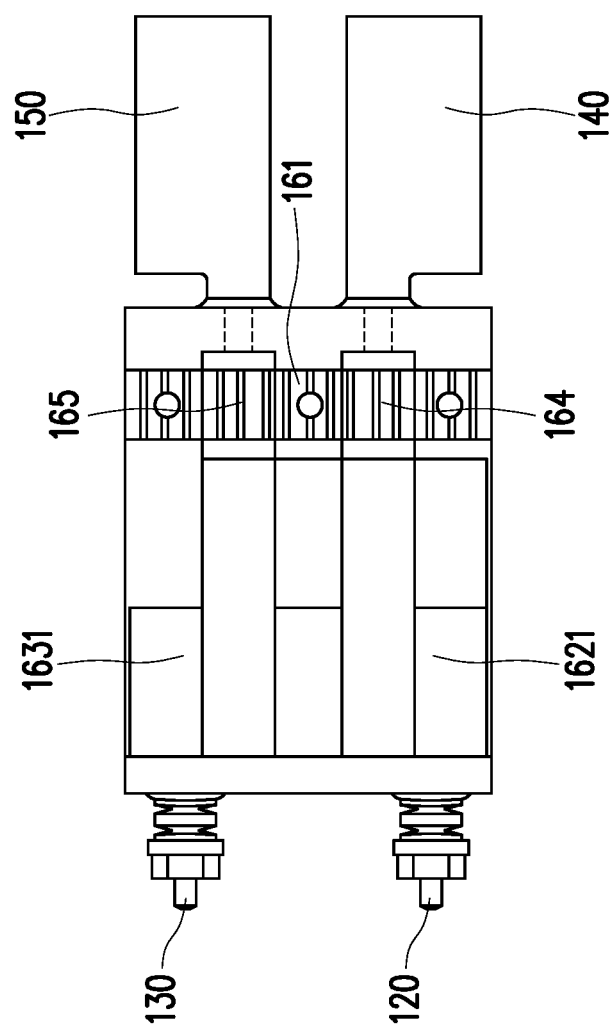
FIG. 2D is a schematic top view of the hinge module of FIG. 2A in the unfolded state.

FIG. 2A is a schematic side view of the hinge module of FIG. 1A in a folded state. FIG. 2B is a schematic top view of the hinge module of FIG. 2A in the folded state. FIG. 2C is a schematic side view of the hinge module of FIG. 1A in an unfolded state. FIG. 2D is a schematic top view of the hinge module of FIG. 2A in the unfolded state.

With reference to FIG. 2A and FIG. 2C, herein, the first shaft 120 and the second shaft 130 linearly move along the two guiding plates 112 through the linkage effect generated by the linkage component 160 to change a spacing distance D between the first shaft 120 and the second shaft 130 and are configured to drive the first bracket 140 and the second bracket 150 to move away from each other or approach each other.

With reference to FIG. 1A, FIG. 1B, FIG. 2B, and FIG. 2D, the two guiding plates 112 are oppositely disposed on the bottom plate 111. Each of the guiding plates 112 has a first sliding slot G1 and a second sliding slot G2, and the first sliding slots G1 do not communicate with the second sliding slots G2. The first shaft 120 penetrates through the two first sliding slots G1 and is adapted to move or rotate with respect to the two first sliding slots G1. The second shaft 130 penetrates through the two second sliding slots G2 and is adapted to move or rotate with respect to the two second sliding slots G2.

With reference to FIG. 1A to FIG. 1E, specifically, the linkage component 160 includes a rack 161, a first sliding base 162, a second sliding base 163, a first gear 164, and a second gear 165.

The rack 161 is disposed on the bottom plate 111 of the base 110 and is relatively closer to the first ends E1 of the first shaft 120 and the second shaft 130. In this embodiment, a plurality of screws 166 penetrating through the bottom plate 111 to lock the rack 161 are also included. In other embodiments, the rack may be fixed onto the bottom plate through an engaging manner, an adhesion manner, or other manners.

The first sliding base 162 and a second sliding base 163 are movably disposed in the base 110 and are respectively pivotally connected to the first shaft 120 and the second shaft 130. Specifically, the first sliding base 162 has a first sleeve 1621 and the second sliding base 163 has a second sleeve 1631. The first sleeve 1621 is located between the two first sliding slots G1, and the first shaft 120 is pivotally connected to the first sleeve 1621. The second sleeve 1631 is located between the two second sliding slots G2, and the second shaft 130 is pivotally connected to the second sleeve 1631.

The first gear 164 and the second gear 165 are respectively sleeved on and fixed to the first ends E1 of the first shaft 120 and the second shaft 130, and the first gear 164 and the second gear 165 mesh with the rack 161. Each of the first ends E1 forms two planes, and each of the first gear 164 and the second gear 165 has a corresponding square hole to be sleeved on each of the first ends E1.

With reference to FIG. 2A to FIG. 2D, When the first bracket 140 and the first shaft 120 respectively rotate (e.g., in a clockwise direction CW or in a counter-clockwise direction CCW) with respect to the two first sliding slots G1 and the first sliding base 162, the first gear 164 is guided by the rack 161 to drive the first shaft 120 to move along the two first sliding slots G1. When the second bracket 150 and the second shaft 130 respectively rotate (e.g., in the clockwise direction CW or in the counter-clockwise direction CCW) with respect to the two second sliding slots G2 and the second sliding base 163, the second gear 165 is guided by the rack 161 to drive the second shaft 130 to move along the two second sliding slots G2.

For instance, with reference to FIG. 2A and FIG. 2B, the first bracket 140 and the first shaft 120 rotate in the counter-clockwise direction CCW, and the second bracket 150 and the second shaft 130 rotate in the clockwise direction CW. In this way, as the first gear 164 and the second gear 165 mesh with the rack 161, the first shaft 120 and the second shaft 130 are guided to move away from each other, and that the spacing distance D is expanded. With reference to FIG. 2C and FIG. 2D, the first bracket 140 and the first shaft 120 rotate in the clockwise direction CW, and the second bracket 150 and the second shaft 130 rotate in the counter-clockwise direction CCW. In this way, as the first gear 164 and the second gear 165 mesh with the rack 161, so that the first shaft 120 and the second shaft 130 are guided to approach each other, and the spacing distance D thereby is reduced.

With reference to FIG. 1B, FIG. 1D, and FIG. 1E, the bottom plate 111 has two sliding rails OB parallel to each other. The first sliding base 162 has a first sliding block 1622 and the second sliding base 162 has a second sliding block 1632. The first sliding block 1622 and the second sliding block 1632 are respectively disposed in the two sliding rails OB and are configured to limit linear movement of the first sliding base 162 and the second sliding base 163 along the two sliding rails OB.

A plurality of ribs B are formed on bottom surfaces of the first sliding base 162 and the second sliding base 163. The plurality of ribs B are in contact with the bottom plate 111 and are configured for reducing a contact area between the first sliding base 162 and the second sliding base 163 and the bottom plate 111, so that friction is reduced, and the first sliding base 162 and the second sliding base 163 may move more smoothly.

In other embodiments, the first sliding base and the second sliding base have smooth bottom surfaces and, for example, are completely in contact with the bottom plate, which is not limited by the disclosure.

A first torque unit 170 and a second torque unit 180 are further included. The first torque unit 170 is disposed at the first end E1 and a second end E2 of the first shaft 120 and is located outside the two guiding plates 112. The second torque unit 180 is disposed at the first end E1 and a second end E2 of the second shaft 130 and is located outside the two guiding plates 112.

In short, the first and the second torque units 170 and 180 are configured to generate torque when the first and the second shafts 120 and 130 rotate, so that positions of the first and second brackets 140 and 150 are fixed after the first and second brackets 140 and 150 turn. The first and second sliding bases 162 and 163 are configured to limit and set the first and second shafts 120 and 130 to be linearly displaced only.

Further, with reference to FIG. 2A and FIG. 2B, in the folded state, the first bracket 140 and the second bracket 150 turn with respect to the two guiding plates 112 and move away from each other, and finally, the first bracket 140 and the second bracket 150 respectively correspond to two short sides S1 of the guiding plate 112. With reference to FIG. 2C and FIG. 2D, in the unfolded state, the first bracket 140 and the second bracket 150 turn with respect to the two guiding plates 112 and approach each other, and finally, the first bracket 140 and the second bracket 150 correspond to a long side S2 of the guiding plate 112.

Figure 3A:
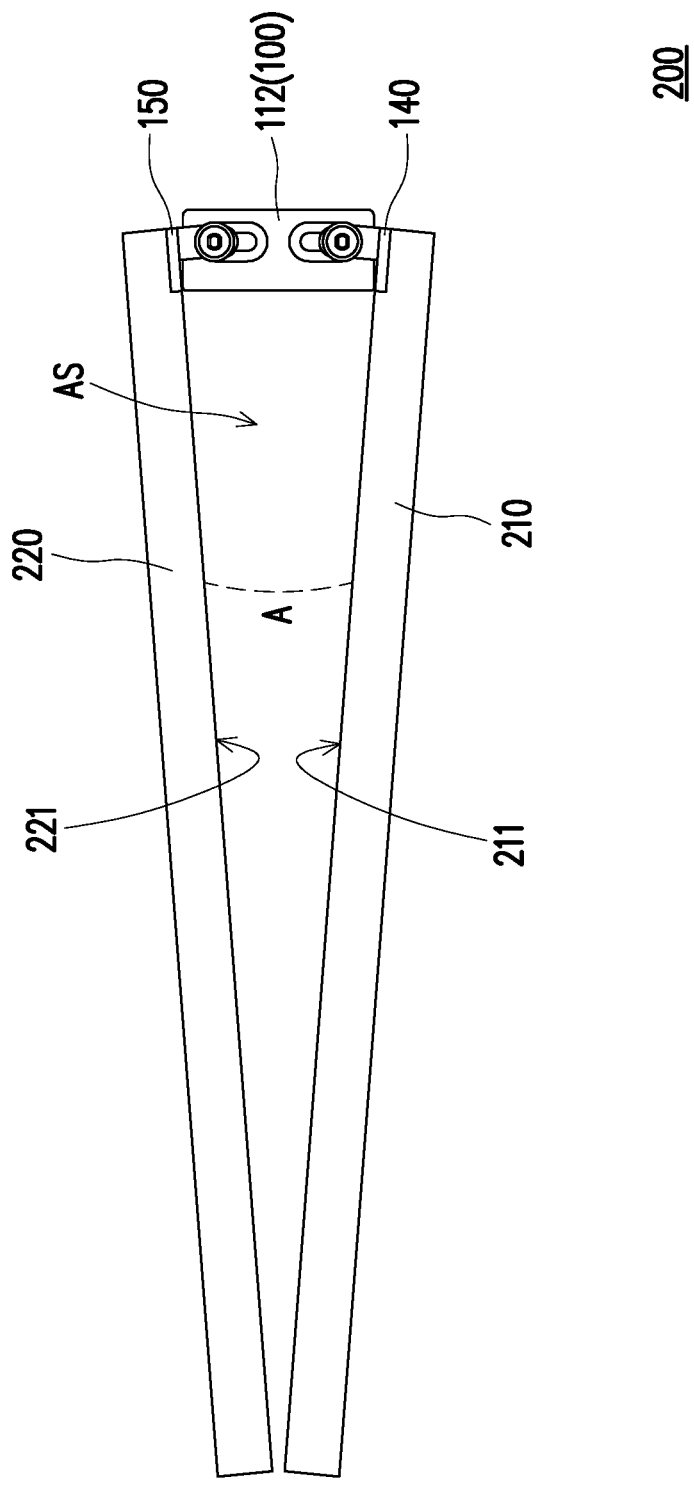
FIG. 3A is a schematic side view of an electronic device in the folded state according to an embodiment of the disclosure.
Figure 3B:
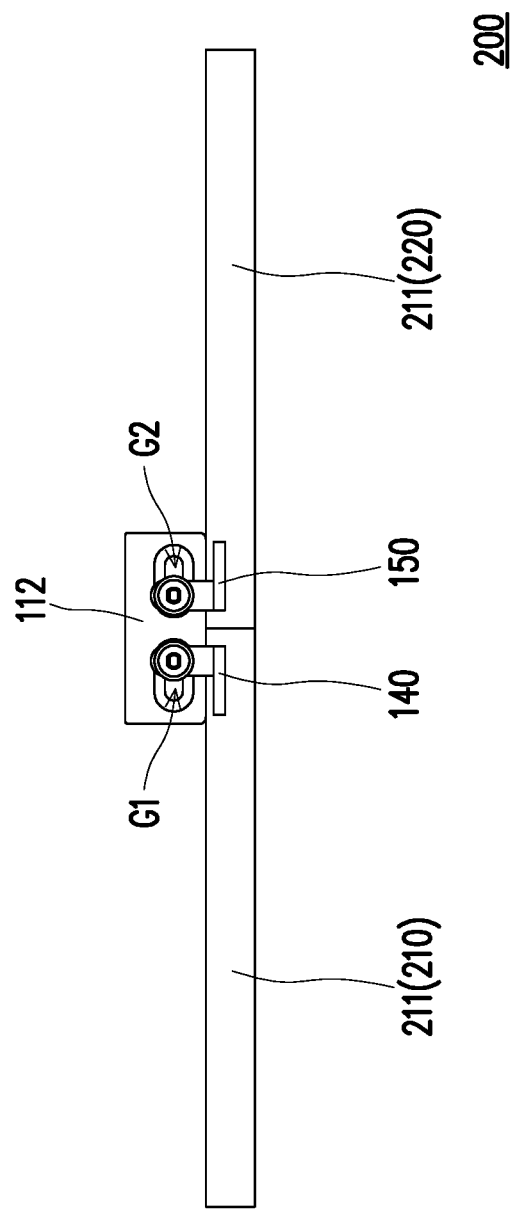
FIG. 3B is a schematic side view of the electronic device of FIG. 3A in the unfolded state.
Figure 3C:
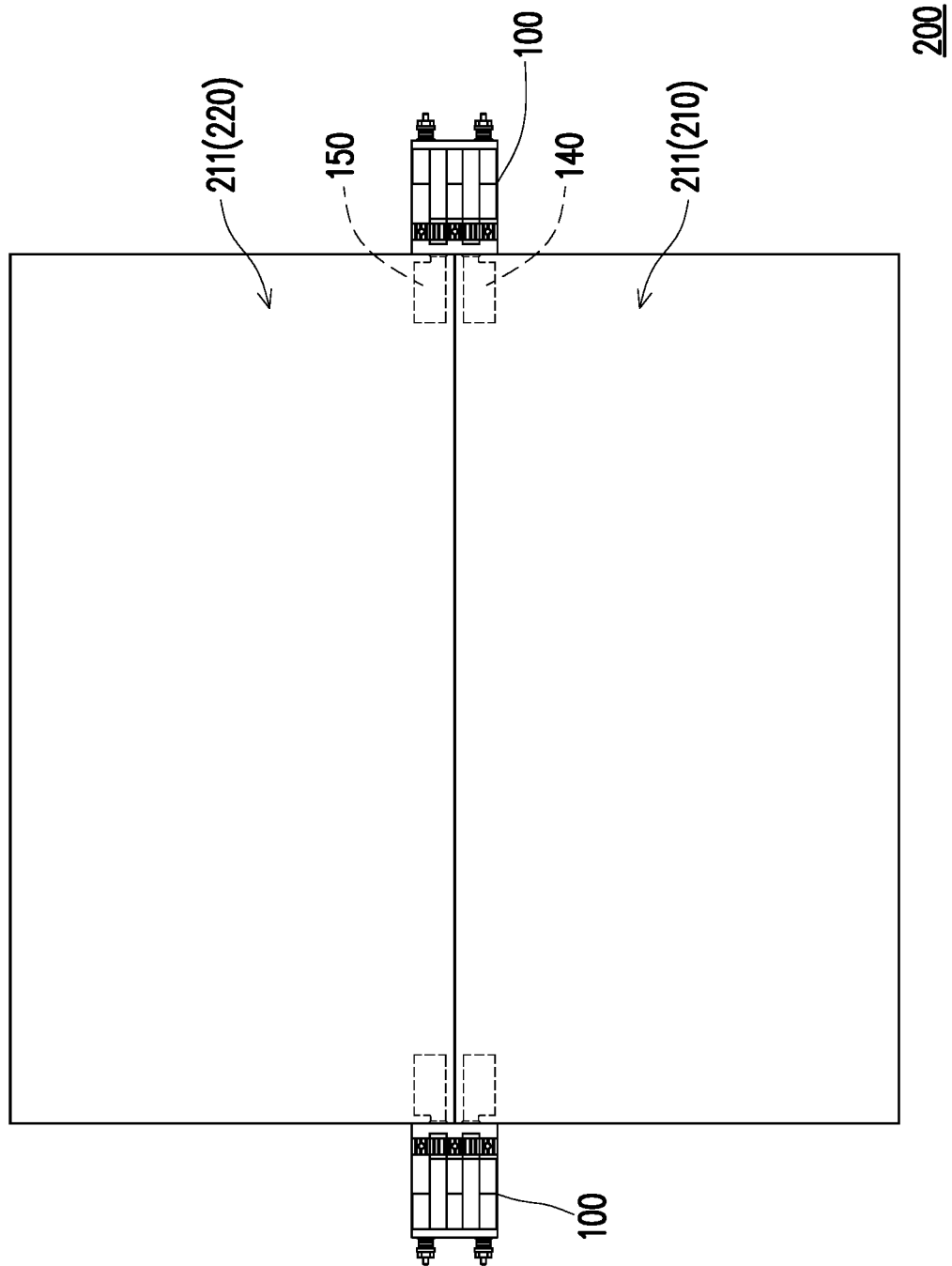
FIG. 3C is a schematic bottom view of the electronic device of FIG. 3B in the unfolded state.

FIG. 3A is a schematic side view of an electronic device in the folded state according to an embodiment of the disclosure. FIG. 3B is a schematic side view of the electronic device of FIG. 3A in the unfolded state. FIG. 3C is a schematic bottom view of the electronic device of FIG. 3B in the unfolded state.

With reference to FIG. 3A to FIG. 3C, an electronic device 200 provided by the disclosure includes two hinge modules 100, a first body 210, and a second body 220. The electronic device 200 is, for example, a notebook computer, a tablet computer, or other similar products. In this embodiment, the two bodies 210 and 220 are both touch screens. In other embodiments, the two bodies respectively are a keyboard and a screen. The two bodies 210 and 220 are respectively connected onto the two hinge modules 100, so that the two bodies 210 and 220 may be switched to the unfolded state and the folded state through the two hinge modules 100.

The first body 210 is fixedly connected to two first brackets 140. The second body 220 is fixedly connected to two second brackets 150. The first body 210 and the second body 220 are adapted to move away from each other or approach each other to be switched to the folded state or the unfolded state (see to the process of switching of the hinge module 100).

In the folded state, the first bracket 140 and the second bracket 150 turn with respect to the two guiding plates 112 and move away from each other, the first bracket 140 and the second bracket 150 respectively correspond to two short sides S1 (see FIG. 2A) of the guiding plate 112, and the spacing distance D between the first shaft 120 and the second shaft 130 is expanded. In this way, an included angle A is provided between the first body 210 and the second body 220, and an accommodating space AS is thus created. Further, the accommodating space AS is configured to receive other functional elements such as a stylus pen.

In the unfolded state, the first bracket 140 and the second bracket 150 turn with respect to the two guiding plates 112 and approach each other, the first bracket 140 and the second bracket 150 correspond to a long side S2 (see FIG. 2C) of the guiding plate 112, and the spacing distance D between the first shaft 120 and the second shaft 130 is reduced. In this way, the first body 210 is tightly fitted to the second body 220 to form a tablet structure. Additionally, a first displace surface 211 of the first body 210 seamlessly closes to a second display surface 221 of the second body 220. In this way, the first body 210 and the second body 220 are integrated as one body, so the electronic device 200 may provide effects for enhancing touch operation, gaming experiences, large-scale image outputs, etc.

Figure 4A:
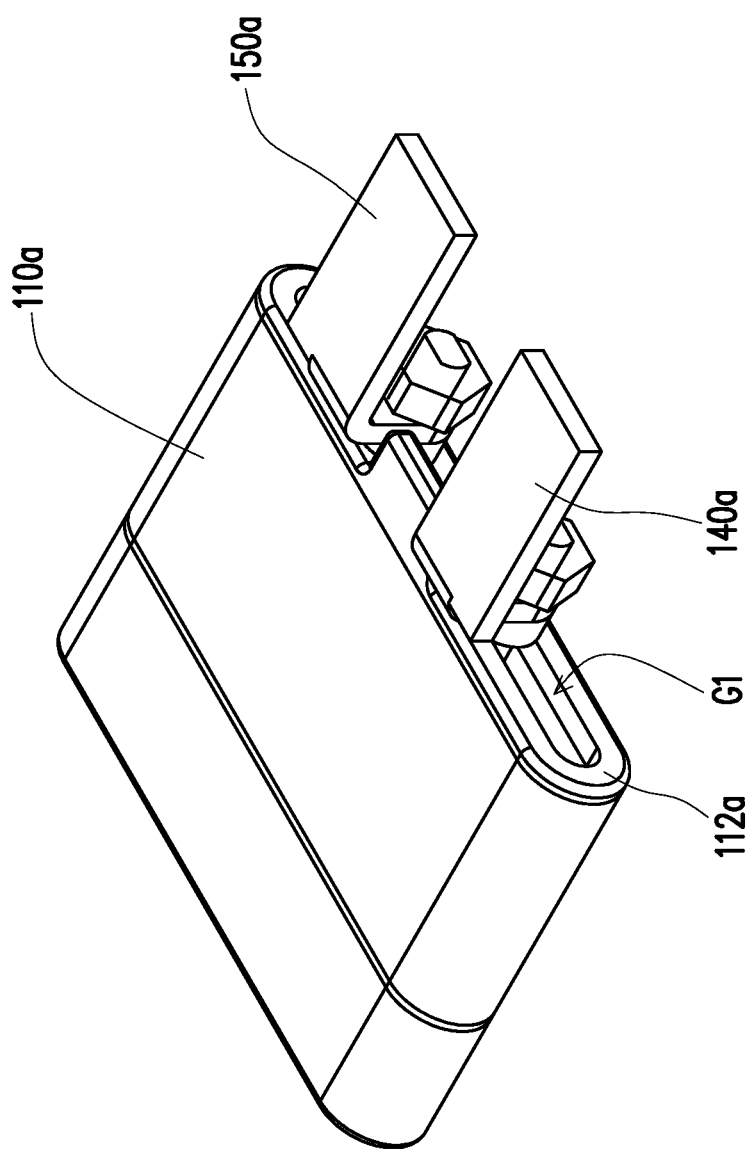
FIG. 4A is a schematic three-dimensional view of a hinge module according to another embodiment of the disclosure.
Figure 4B:
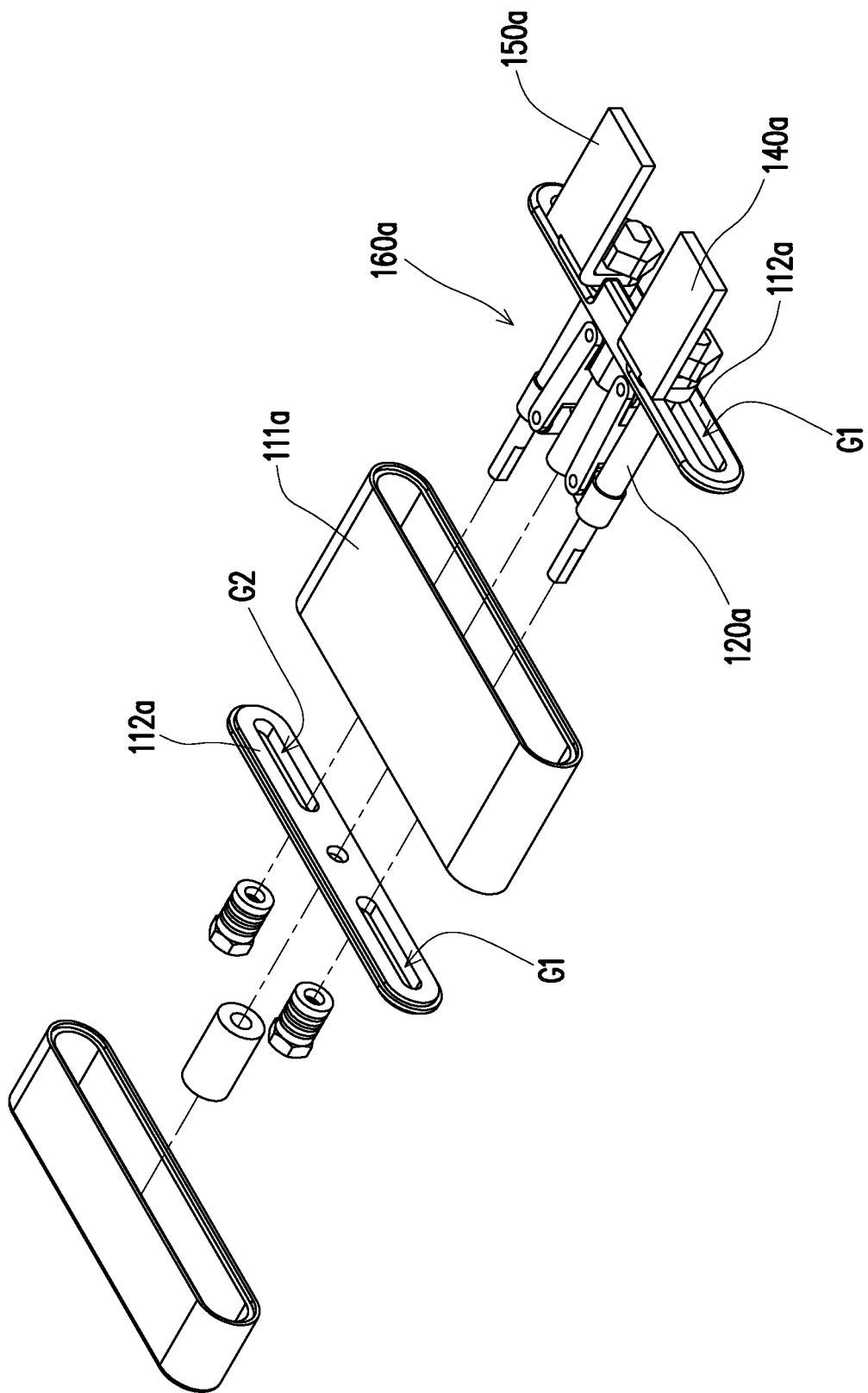
FIG. 4B is a schematic exploded view of elements of the hinge module of FIG. 4A.
Figure 5A:
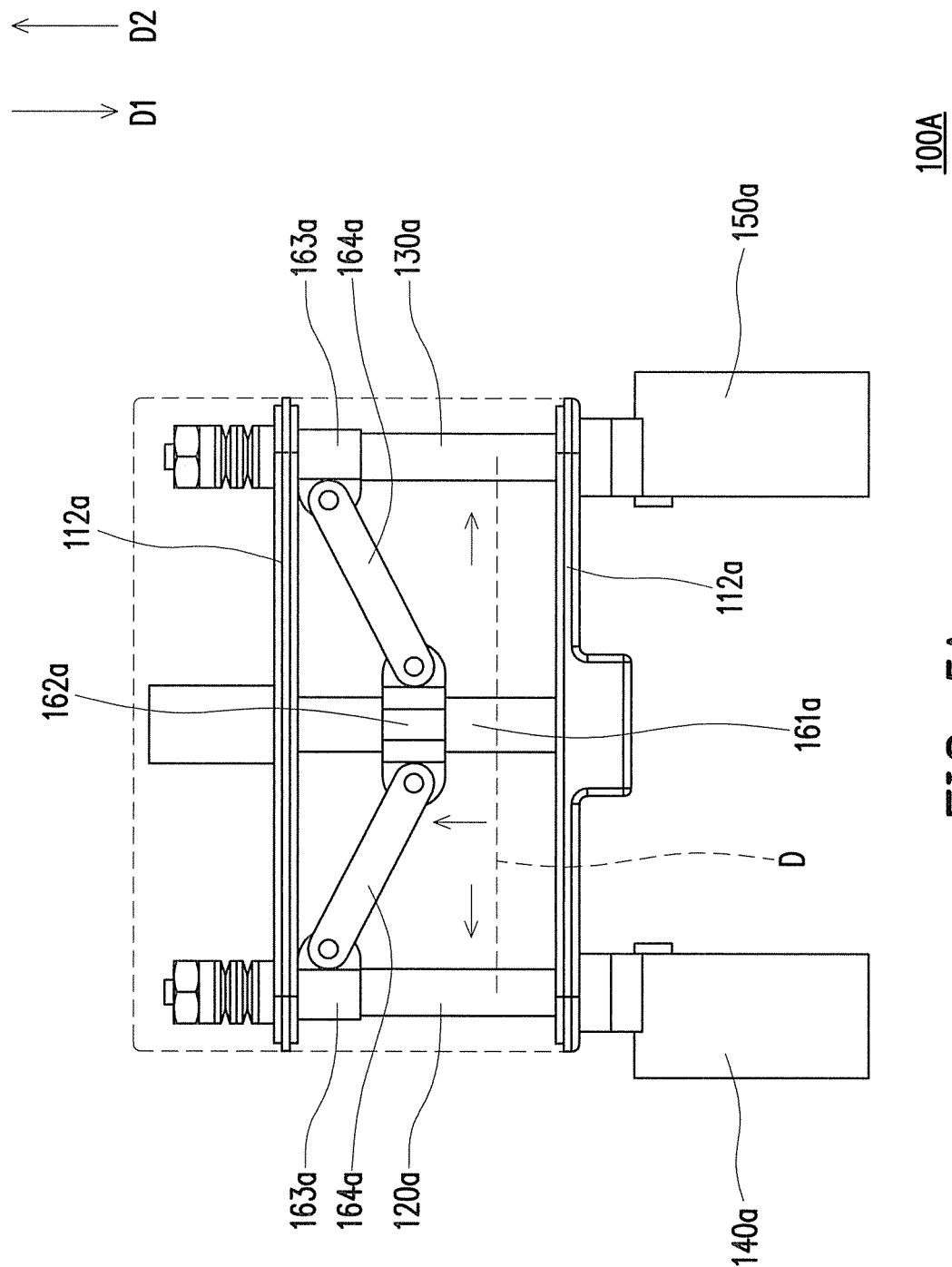
FIG. 5A is a schematic view of a first shaft and a second shaft of the hinge module of FIG. 4B moving away from each other relatively.
Figure 5B:
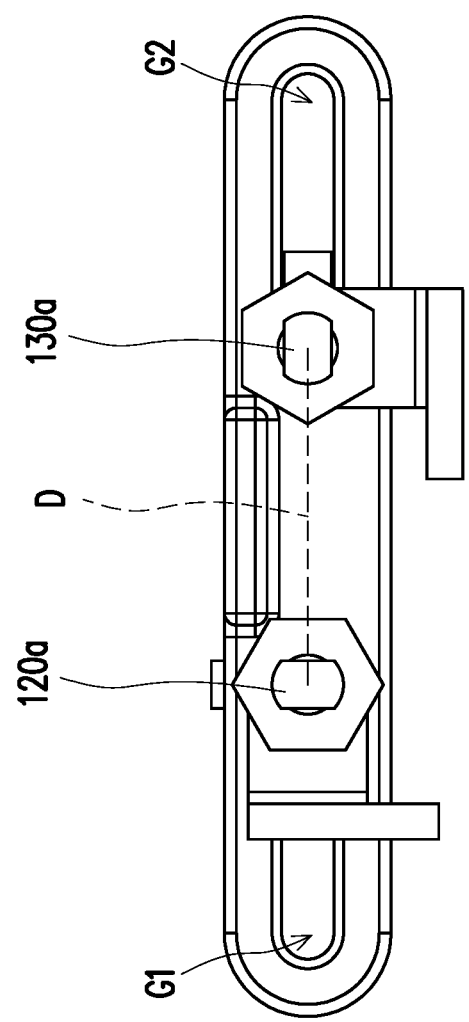
FIG. 5B is schematic view of rotation of a first bracket and a second bracket of the hinge module of FIG. 4A respectively.

FIG. 4A is a schematic three-dimensional view of a hinge module according to another embodiment of the disclosure. FIG. 4B is a schematic exploded view of elements of the hinge module of FIG. 4A. FIG. 5A is a schematic view of a first shaft and a second shaft of the hinge module of FIG. 4B moving away from each other relatively. FIG. 5B is schematic view of rotation of a first bracket and a second bracket of the hinge module of FIG. 4A respectively.

With reference to FIG. 4A and FIG. 4B, a hinge module 100A of this embodiment has a linkage component 160A. The linkage component 160A includes a fixing pillar 161a, a collar 162a, two sleeves 163a, and two connection arms 164a.

The fixing pillar 161a is disposed in a base 110a and is fixed to two guiding plates 112a. The collar 162a is movably sleeved on the fixing pillar 161a and is adapted to move back and forth along the fixing pillar 161a. Two sleeves 163a are respectively sleeved on a first shaft 120a and a second shaft 130a and are located between the two guiding plates 112a, and the first shaft 120a and the second shaft 130a are adapted to freely rotate relative to the two sleeves 163a. Each of the two connection arms 164a is pivotally connected to each of the two sleeves 163a and the fixing pillar 161a.

Herein, when the collar 162a moves along the fixing pillar 161a, the two sleeves 163a are adapted to be synchronously driven through the two connection arms 164a, so that the first shaft 120a moves along two first sliding slots G1 and the second shaft 130a moves along two second sliding slots G2.

With reference to FIG. 4A and FIG. 5A, the collar 162a moves in a first direction D1 along the fixing pillar 161a, so that the first shaft 120a and the second shaft 130a are driven to approach each other relatively and a spacing distance D therebetween is reduced. Conversely, when the collar 162a moves in a second direction D2 along the fixing pillar 161a, the first shaft 120a and the second shaft 130a are driven to move away from each other relatively and the spacing distance D therebetween is expanded. With reference to FIG. 4A and FIG. 5B, the first shaft 120a and the second shaft 130a are adapted to freely rotate relative to the two sleeves 163a without affecting each other.

In view of the foregoing, the hinge module provided by the disclosure is adapted to be connected to the first body and the second body (e.g., display screens) of the electronic device, and when the first body and the second body are unfolded relatively or folded relatively, the first body and the second body may be driven through the linkage component to move away from each other relatively or approach each other relatively. When the electronic device is switched to the unfolded state, the spacing distance between the first shaft and the second shaft is reduced, so that the first body and the second body may be close to and integrated with each other, and that effects for enhancing touch operation, gaming experiences, large-scale image outputs, etc. are provided. When the electronic device is switched to the folded state, the spacing distance between the first shaft and the second shaft is expanded, so that the first body and the second body are separated from each other relatively and an accommodating space therebetween is formed, and such space may thus be used to receive other functional elements such as a stylus pen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge module, adapted to allow an electronic device to be switched between a folded state and an unfolded state, the hinge module comprising:
    a base, having a bottom plate and two guiding plates opposite to each other;
    a first shaft, movably and rotatably penetrating through the guiding plates;
    a second shaft, movably and rotatably penetrating through the guiding plates, wherein the first shaft and the second shaft are spaced apart from each other and are located above the bottom plate;
    a first bracket, disposed at a first end of the first shaft;
    a second bracket, disposed at a first end of the second shaft; and
    a linkage component, disposed in the base and connected to the first shaft and the second shaft,
    wherein the first shaft and the second shaft linearly move along the guiding plates through the linkage component to change a spacing distance between the first shaft and the second shaft and are configured to drive the first bracket and the second bracket to move away from each other or to approach each other, when in the folded state, the first shaft and the second shaft have a first spacing distance therebetween, and when in the unfolded state, the first shaft and the second shaft have a second spacing distance therebetween smaller than the first spacing distance.

2. The hinge module as claimed in claim 1, wherein the guiding plates are oppositely disposed on the bottom plate, each of the guiding plates has a first sliding slot and a second sliding slot, the first shaft penetrates through the first sliding slots and is adapted to move or rotate with respect to the first sliding slots, and the second shaft penetrates through the second sliding slots and is adapted to move or rotate with respect to the second sliding slots.

3. The hinge module as claimed in claim 1, wherein the linkage component comprises:
    a rack, disposed on the bottom plate of the base;
    a first sliding base and a second sliding base, movably disposed in the base and pivotally connected to the first shaft and the second shaft respectively; and
    a first gear and a second gear, respectively sleeved on and fixed to the first ends of the first shaft and the second shaft, the first gear and the second gear mesh with the rack,
    wherein the first gear is guided by the rack to drive the first shaft to move along the first sliding slots when the first bracket and the first shaft respectively rotate with respect to the first sliding slots and the first sliding base, and the second gear is guided by the rack to drive the second shaft to move along the second sliding slots when the second bracket and the second shaft respectively rotate with respect to the second sliding slots and the second sliding base.

4. The hinge module as claimed in claim 3, wherein the bottom plate has two sliding rails parallel to each other, the first sliding base has a first sliding block and the second sliding base has a second sliding block, and the first sliding block and the second sliding block are respectively disposed in the two sliding rails and are configured to limit movement of the first sliding base and the second sliding base along the sliding rails.

5. The hinge module as claimed in claim 3, wherein a plurality of ribs are formed on bottom surfaces of the first sliding base and the second sliding base, and the ribs are in contact with the bottom plate.

6. The hinge module as claimed in claim 3, wherein the first sliding base has a first sleeve and the second sliding base has a second sleeve, the first sleeve is located between the two first sliding slots and the first shaft is pivotally connected to the first sleeve, and the second sleeve is located between the two second sliding slots and the second shaft is pivotally connected to the second sleeve.

7. The hinge module as claimed in claim 3, further comprising a plurality of screws, penetrating through the bottom plate to lock the rack.

8. The hinge module as claimed in claim 1, further comprising a first torque unit and a second torque unit, wherein the first torque unit is disposed at the first end and a second end of the first shaft and is located outside the two guiding plates, and the second torque unit is disposed at the first end and a second end of the second shaft and is located outside the two guiding plates.

9. The hinge module as claimed in claim 1, wherein when switching to the folded state, the first bracket and the second bracket turn with respect to the guiding plates and move away from each other, and the first bracket and the second bracket are respectively and substantially parallel to two shorter sides, vertical to the bottom plate, of the guiding plate in the folded state.

10. The hinge module as claimed in claim 1, wherein when switching to the unfolded state, the first bracket and the second bracket turn with respect to the guiding plates and approach each other, and the first bracket and the second bracket are parallel to a longer side, extending in a moving direction of the first shaft and the second shaft, of the guiding plate in the unfolded state.

11. An electronic device, comprising:
two hinge modules, each of the hinge modules comprising:
a base, having a bottom plate and two guiding plates opposite to each other;
a first shaft, movably and rotatably penetrating through the guiding plates;
a second shaft, movably and rotatably penetrating through the guiding plates, wherein the first shaft and the second shaft are spaced apart from each other and are located above the bottom plate;
a first bracket, disposed at a first end of the first shaft;
a second bracket, disposed at a first end of the second shaft; and
a linkage component, disposed in the base and connected to the first shaft and the second shaft,
wherein the first shaft and the second shaft linearly move along the guiding plates through the linkage component to change a spacing distance between the first shaft and the second shaft and are configured to drive the first bracket and the second bracket to move away from each other or to approach each other;
a first body, disposed on the hinge modules, the first body fixedly connected to the first brackets; and
a second body, disposed on the hinge modules, the second body fixedly connected to the second brackets,
wherein the first body and the second body are adapted to move away from each other or approach each other to be switched between a folded state and an unfolded state, when the first body and the second body are in the folded state, the first shaft and the second shaft have a first spacing distance therebetween, and when the first body and the second body are in the unfolded state, the first shaft and the second shaft have a second spacing distance therebetween smaller than the first spacing distance.

12. The electronic device as claimed in claim 11, wherein when the first body and the second body are moved to switch to the folded state, the first bracket and the second bracket turn with respect to the guiding plates and move away from each other, the first bracket and the second bracket are substantially and respectively parallel to two shorter sides, vertical to the bottom plate, of the guiding plate, and the spacing distance between the first shaft and the second shaft is expanded, so that an included angle is provided between the first body and the second body, and the first body and the second body cooperatively defines an accommodating space.

13. The electronic device as claimed in claim 11, wherein when the first body and the second body are moved to switch to the unfolded state, the first bracket and the second bracket turn with respect to the guiding plates and approach each other, the first bracket and the second bracket are parallel to a longer side, extending in a moving direction of the first shaft and the second shaft, of the guiding plate, and the spacing distance between the first shaft and the second shaft is reduced in the unfolded state, so that the first body is tightly fitted to the second body to form a tablet structure.

* * * * *